United States Patent [19]

Lebkuchner

[11] 3,911,300
[45] Oct. 7, 1975

[54] ENCAPSULATED WET DYNAMOELECTRIC MACHINE ROTOR
[75] Inventor: Benno Lebkuchner, Warwick, R.I.
[73] Assignee: Taco, Inc., Cranston, R.I.
[22] Filed: Aug. 13, 1971
[21] Appl. No.: 171,694

[52] U.S. Cl. .................................... 310/86; 310/90
[51] Int. Cl.² ........................................ H02K 5/12
[58] Field of Search ........... 310/66, 86, 87, 273, 85, 310/90, 217, 42, 105, 52; 417/420, 423, 366

[56] References Cited
UNITED STATES PATENTS

| | | | |
|---|---|---|---|
| 2,838,703 | 6/1958 | Balke | 310/217 |
| 2,931,307 | 4/1960 | Smith | 310/217 |
| 3,228,341 | 1/1966 | Hungerford | 310/90 |
| 3,231,768 | 1/1966 | Dannenmann | 310/83 |
| 3,366,813 | 1/1968 | Madsen | 310/86 |
| 3,426,691 | 2/1969 | Anderson | 310/87 |

Primary Examiner—R. Skudy
Attorney, Agent, or Firm—Lane, Aitken, Dunner & Ziems

[57] ABSTRACT

An electric wet motor pump in which the rotor of the electric motor is supported within a container which is isolated from the stator. The arrangement of the components of the rotor assembly coupled with the thickness of the container wall provides accurate relative spacing between the rotor and the stator.

The rotor components are assembled by a method which includes the use of a curable adhesive and ensures coaxiality between the shaft and the outside diameter of the container with consequent coaxiality of the rotor and the stator.

8 Claims, 8 Drawing Figures

INVENTOR
BENNO LEBKUCHNER

BY Lane, Aitken, Dunner & Ziems
ATTORNEY

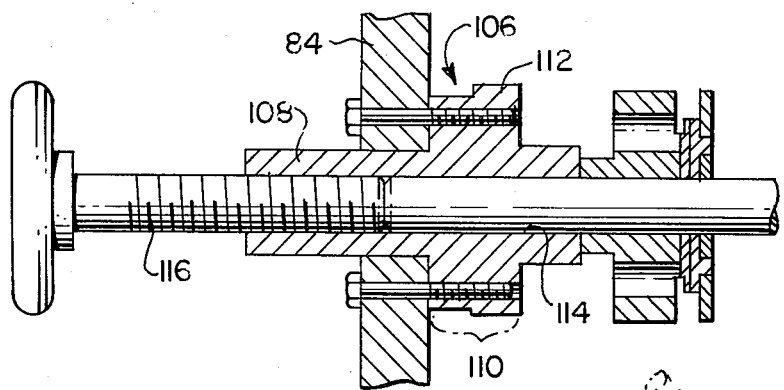
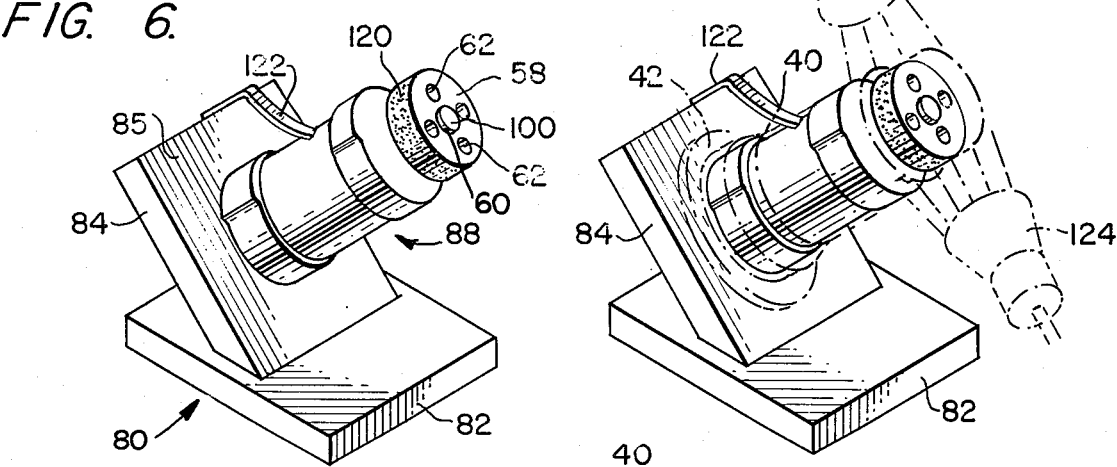
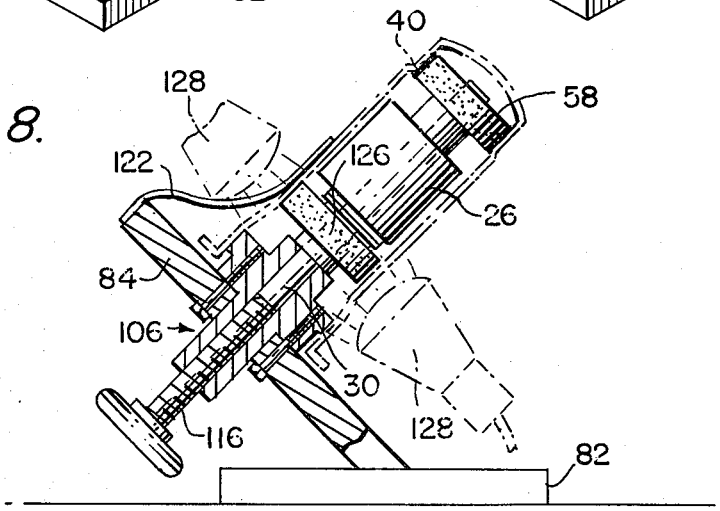

3,911,300

ENCAPSULATED WET DYNAMOELECTRIC MACHINE ROTOR

BACKGROUND OF THE INVENTION

1. Field of the Invention

This invention relates to a dynamoelectric machine with fluid lubricated bearings and the method of assembly of the rotor assemblage. More particularly it relates to a wet motor pump and method of assembly of an easily field-replaceable rotor.

2. Description of the Prior Art

Wet motor pumps have been designed where the fluid to be pumped, e.g., water, is used to lubricate the bearings supporting the rotor. An example of such a pump used as a circulator for hot water heating systems is disclosed in my U.S. Pat. No. 3,264,653 assigned to the same assignee as the instant invention.

The pump disclosed in my above-noted patent encapsulated the rotor to provide lubrication for the shaft bearings without permitting the fluid to enter the stator chamber. This arrangement eliminated the stuffing box normally required with such as motor but required accurate maching of shaft bearing retaining bosses to ensure coaxiality between the rotor and the stator.

SUMMARY OF THE INVENTION

In accordance with the present invention, a self-contained rotor assemblage is rapidly and accurately prepared for coaxial alignment with the stator. Only a single seal is required to provide a liquid-free stator enclosure thus permitting rapid field replacement of the rotor while maintaining coaxiality with the stator.

An object of the present invention is to provide a method of assembly for a pump motor of the above-mentioned type which is simple, rapid, economical, and ensures coaxiality with the stator.

Another object of the invention is to provide a wet motor pump of the above-mentioned type which is easy to maintain and trouble-free in operation.

Further objects and advantages of the present invention will become apparent and the exact nature of the invention will be clearly understood when the following description is considered in conjunction with the drawings.

BRIEF DESCRIPTION OF THE DRAWINGS

FIG. 5 is a fragmentary cross-sectional view, of a rotor assembly fixture usable in assembling the rotor of the pump of FIG. 1.

FIG. 6 is a perspective view of the base fixture of FIG. 2 with the bearing placement fixture of FIGS. 3 and 4 mounted thereon.

FIG. 7 is a perspective view of the bearing placement fixture of FIG. 6 with a container shown in place in phantom.

FIG. 8 is a side view, partially in section, showing the rotor assembly fixture of FIG. 5 mounted upon the base fixture of FIG. 2 with the rotor assemblage in place.

DESCRIPTION OF THE PREFERRED EMBODIMENTS

Figure 1:
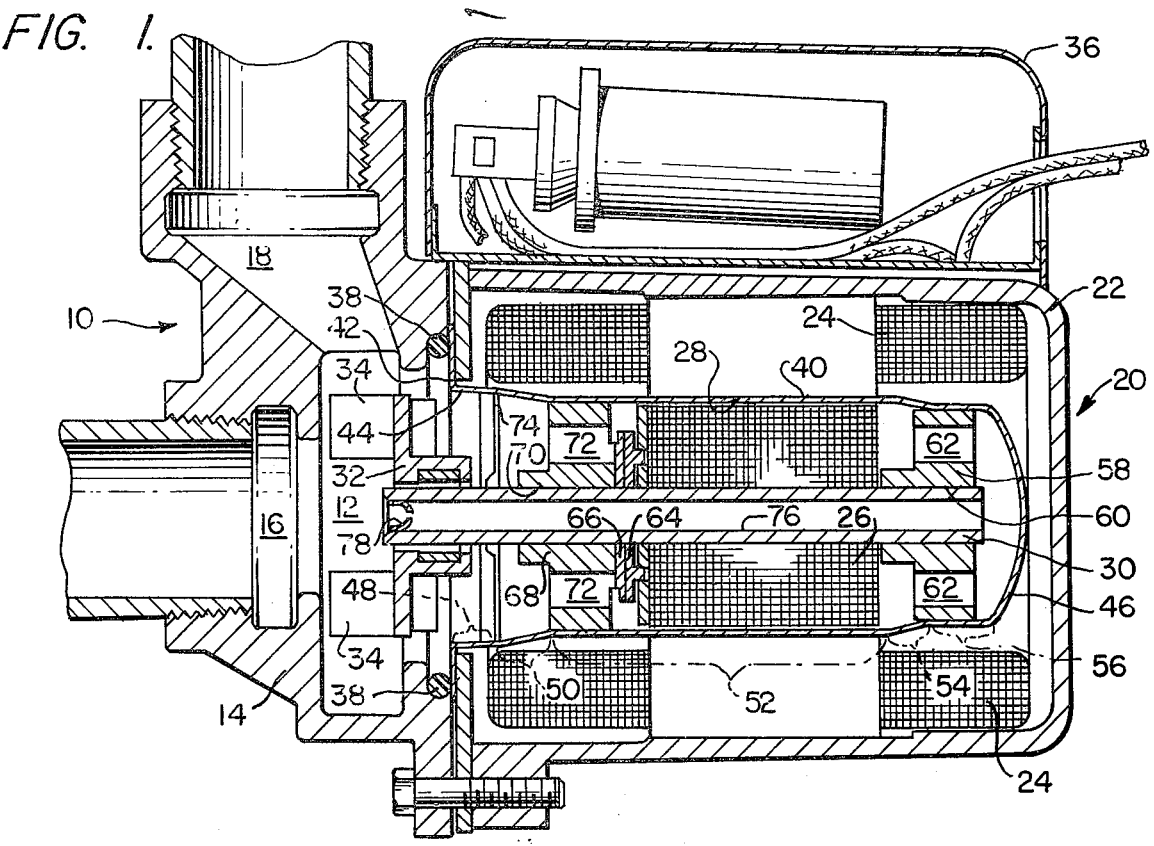
FIG. 1 is a longitudinal cross-sectional view of a wet motor pump embodying features of the present invention.

FIG. 1 shows a wet motor pump 10 which includes the features of the present invention. The pump 10 includes a pumping chamber 12 which is formed in a pump chamber casing 14 which has an inlet passageway 16 and an outlet passageway 18. A pump motor 20 is connected to the pump casing and comprises a housing 22 containing a stator 24 and a rotor 26. The stator 24 has a centrally located coaxial bore 28 within which the rotor 26 is coaxially located as described in detail below.

The rotor 26 is coaxially attached to a drive shaft 30. An impeller 32, which has several impeller blades 34 fixed thereto, is keyed to the left portion of the drive shaft 30 as viewed in FIG. 1. The electric controls for the pump motor 20 are contained atop the motor in a control housing 36 and are connected to a source of electricity (not shown). The pump motor housing 22 is removably attached to the pump chamber casing 14 and is sealed against leakage at the point of attachment by an O⁻ ring seal 38 which may be made of rubber.

A fluid impermeable, generally cylindrical container 40 contains and supports the rotor 26 in proper spaced relationship to the stator 24. The container 40 is firmly fitted in the stator bore 28 so that it is coaxially aligned with the stator. The container has a flange 42 on the left end thereof which has an opening 44. The right end 46 of the container 40 is closed and has a domed shape in order to enable the container to better withstand internal pressures.

Due to the combined effects of the coaxial location of the rotor 26 within the container, the coaxial placement of the container 40 within the stator, as well as the container's uniform wall thickness, the rotor is coaxially aligned within the stator and an effective, accurately determined air gap exists between the rotor 26 and the stator bore 28. The container 40, is, of necessity, formed of a material with low magnetic permeability such as austenitic stainless steel.

The container 40, while generally cylindrical, has a cylindrical portion 48 with the flange 42, a frustro-conical section 50, a central cylindrical portion 52, a frustro-conical section 54 and a cylindrical portion 56 which is closed by the domeshaped end portion 46.

A bearing 58 is fixed within the cylindrical portion 56 of the container 40 in a manner to be described in detail below. The bearing 58 is mounted within the container 40 so that the bearing's journal surface 60 is coaxial with the axis of the container. The bearing 58 has axial passageways 62 spaced radially outward from the journal surface. The right end of the shaft 30 is journaled upon the journal surface 60 of the bearing 58. A thrust washer 64 and a thrust plate 66 are carried by the shaft 30 with the washer 64 abutting the rotor 26 at the rotor's left end.

A bearing 68 is fixed within the cylindrical portion 52 of the container 40 and journals the left end of the shaft 30 on its journal surface 70. The bearing 68 also has axial passageways 72 spaced radially outward from the journal surface 70. A seal 74 is fixed within the cylindrical portion 48 of the container 40 and seals against the shaft 30. The seal 74 is so disposed that a pressure differential from the direction of the pumping chamber 12 would tend to increase the seal's contact with the shaft 30 thereby increasing its efficacy as a seal.

The shaft 30 has an axial passageway 76 extending for its entire length. The left end of the passageway 76 opens into the pumping chamber 12 and its right end opens into the dome-shaped portion 46 of the container 40. An orifice constrictor 78 is inserted within the left end of the axial passageway 76. The axial passageway 76 thus establishes communication between the pumping chamber 12 and the interior of the container 40.

In operation, the pump motor 20, supplied with electricity through the electrical controls housed in the motor control housing 36 causes the rotor 26 to rotate in a conventional manner to rotate the impeller 32. The rotating impeller blades 34 operate within the pumping chamber 12 to draw fluid in the inlet passageway 16 and force the fluid out through the outlet passageway 18. A portion of the fluid entering the pumping chamber 12 is forced into the axial passageway 76, through the orifice constrictor 78, and into the right portion of the container 40. The fluid within the container 40 then passes through the passageways 62 in the bearing 58 and between the rotor 26 and the container portion 52. The fluid, after passing around the rotor 26, proceeds through the passageways 72 in the bearing 68 so as to completely fill the container. The bearings 58 and 68 are of sintered metal or the like so that the fluid lubricates the journal surfaces 60 and 70.

The seal 74 isolates the rotor and pump chambers so that the pumped fluid can enter and leave the container 40 only through the passageway 76. The orifice constrictor 78 in the entranceway of the axial passageway 76 slows down the movement of fluid into and out of the container. In this manner, the bearings are lubricated, the temperature within the container is maintained at a reasonable level and excessive contamination of the interior of the container 40 is prevented because fluid is not pumped continuously through the container to continuously introduce new foreign matter into the container.

For proper operation a specific gap must exist between the rotor 26 and the stator bore 28. Additionally, proper operation of the wet motor pump 10 requires coaxiality between the rotor 26 and the stator bore 28. The required gap between the rotor 26 and the stator bore 28 is maintained by virtue of the relationship between the rotor and the container 40 and the corresponding relationship between the container and the stator bore. The coaxiality of the rotor 26 with respect to the stator bore 28 is accomplished by the method of assembly of the assemblage of parts within the container 40 effected as detailed below.

Figure 2:
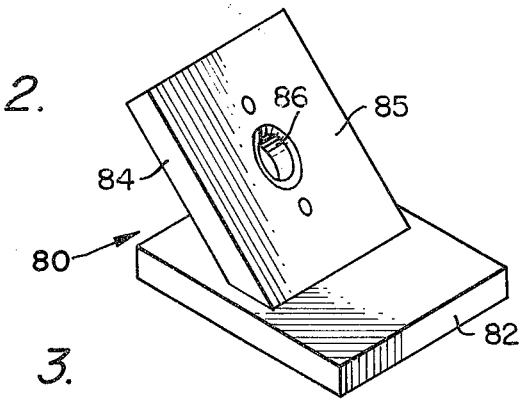
FIG. 2 is a perspective view of a base fixture usable in assembling the rotor assemblage of the pump of FIG. 1.

FIG. 2 shows a base fixture 80 which has a horizontal portion 82 which supports an angled portion 84 and which has a plane surface 85 fixed to the horizontal portion. The angled portion 84 has an opening 86 of a size permitting reception of the fixtures described below.

Figure 3:
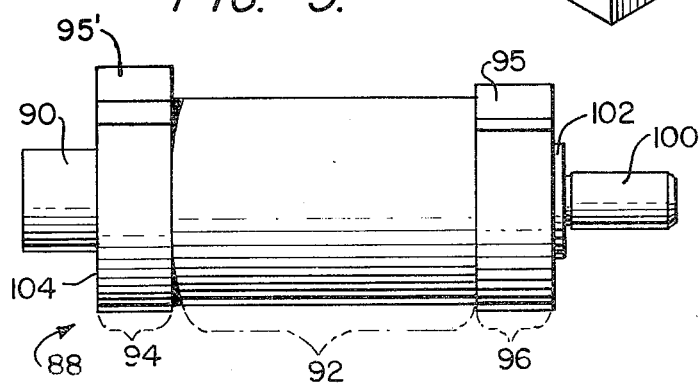
FIG. 3 is a side elevational view of a bearing placement fixture used in assembling the rotor of the pump of FIG. 1.

FIG. 3 shows a bearing placement fixture 88 of generally cylindrical configuration which has a support projection 90 of a size compatible with insertion into the opening 86 in the angled portion 84 of the base fixture 80. The diameter of a central cylindrical portion 92 of the fixture 88 is less than the internal diameter of the cylindrical portion 52 of the container 40. The portions of the fixture 88 to the immediate left and right of the fixture (designated by reference numerals 94 and 96 respectively) are generally cylindrical in shape and of somewhat larger diameter then the portion 92.

Figure 4:
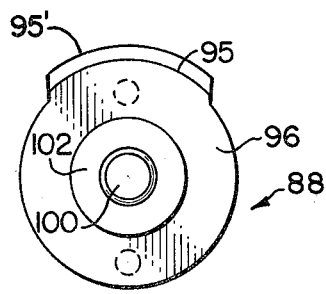
FIG. 4 is an end elevational view of the fixture of FIG. 3.

FIG. 4 best illustrates the coaxial radially extending character of the upper portions 95 and 95' of the parts 94 and 96 of the fixture 88. The radial distance from the center of the fixture 88 to the radially outermost part of the portions 95 and 95' is equal to the mean value of the acceptable range of radial distances between the axis of the container 40 and the inside of the cylindrical portions 48 and 52 respectively.

As viewed in FIG. 3, a bearing support projection 100 appears at the right end of the fixture 88 of a diameter which approximates the diameter of the shaft 30. The projection 100 is located coaxially with the fixture 88. A thin shoulder portion 102 of larger diameter than the projection 100 appears between the projection 100 and the larger portion 96 of the fixture 88. The distal end of the shoulder 102 is a predetermined distance from a plane surface 104 of the portion 94 of the fixture 88. This predetermined distance equals the axial distance within the rotor assemblage, as seen in FIG. 1, between the flange 42 of the container 40 and the basal portion of the bearing 58.

FIG. 5 illustrates a generally cylindrical rotor assembly fixture 106 which has a left portion 108 sized for insertion into an opening similar to the opening 86 in a base fixture similar to the base fixture 80. The fixture 106 has a cylindrical portion 110 which includes a larger, coaxial, radially outward portion 112 similar in size and shape to the portion 95' of the fixture 88. As in the fixture 88 illustrated in FIG. 3, the radial distance of the outer portion of the portion 112 is equal to the mean of the acceptable radial distances of the interior of the cylindrical portion 48 of the container 40.

An axial passageway 114 appears in the rotor assembly fixture 106 of a diameter to accommodate the drive shaft 30. The portion of the axial passageway 114 within the left portion 108 of the rotor assembly fixture 106 is internally threaded and carries a threaded adjustment rod 116 therein.

FIG. 6 illustrates the bearing placement fixture 88 inserted in the portion 84 of the base fixture 80 at an angle to the horizontal which is shown for illustration purposes as approximately 45°. The bearing 58 is shown with its journal surface 60 temporarily journaled upon the bearing support projection 100 which, as noted above, is coaxial with the fixture 88. Due to the relationship between the shoulder 102 and the plane surface 104 of the fixture 88 (best seen in FIG. 3), the plane surface 85 of the fixture 80 abutting the surface 104 establishes a predetermined spaced relationship between the plane surface 85 and the distal surface of the shoulder 102. When the bearing 58 is journaled upon the bearing support projection 100 its basal portion abuts the distal portion of the shoulder 102 and the bearing assumes a spaced predetermined relationship with respect to the surface 85. A curable ashesive 120, such as one of the epoxys, is applied to the periphery of the bearing 58.

In FIG. 7 the container 40 is shown, in phantom, inserted over the fixture 88. As the container 40 encloses the fixture 88 containing the bearing 58 journaled thereon, the interior surface of the container 40 comes in contact with the radially outward extensions 95 and 95' on the fixture 88. This contact is effected by virtue of a force exerted upon the container 40 due to gravity. If this force proves insufficient a spring 122 may be pivotally attached, at one end, to the fixture 80 and may bear against the outer portion of the container, between the portions 95 and 95', at the unattached end. This spring force urges the container's inner portion against the portions 95 and 95' of the fixture 88.

As noted above, the portions 95 and 95' of the fixture 88 are radially extending portions and are not circular in cross-section. This configuration provides for more accurate, concentric assembly of the final rotor assemblage despite the existence of nominal differences in internal radii of different containers 40 due to manufacturing deviations. If the portions 95 and 95' were circular in cross-section, their radii would have to equal the minimum allowable corresponding radii of a container. This would result in relatively increasing eccentric mounting of rotor assemblages as the radii of containers increased to values greater than this minimum radial distance. By use of radially extending portions 95 and 95' of mean radial dimension (midway between the value of acceptable variations), containers within the allowable radial tolerances will result in rotor assemblages which are eccentric by only one-half of the value of their difference from the mean value. Also, the fixture 88 is usable with cylinders 40 which have radii with values both above and below the mean value.

The container 40 is advanced over the fixture 88 until the flange 42 abuts the surface 85 of the fixture 80. In this position, due to the spaced coaxial relationship between the most radially outward portion of the portions 94 and 96 and the axis of the fixture 88, the bearing 58 is located coaxially within the container 40. Also, due to the existence of the portions 95 and the progressively smaller stepped portions 48, 50, 52, 54 and 56 of the container 40, the curable adhesive 120 placed upon the periphery of the bearing has not wiped any portion of the interior wall of the container other than the interior of the portion 56.

The container 40 thus has the bearing 58 coaxially located therein at a distance from the opening 44 of the container which is the desired distance due to the relationship between the fixture 88 and the surface 85 of the fixture 80. Sources of heat 124 located around the periphery of the portion of the container opposite the location of the bearing 58 are activated to cure the curable adhesive 120 thus bonding the bearing 58 coaxially within the container 40 at the specified distance from the opening 44.

FIG. 8 shows the fixture 106 located in a base fixture similar to the base fixture 80. The shaft 30 has the rotor 26 fixedly positioned upon the shaft at a point a predetermined distance from the right end of the shaft. The thrust washer 64, the thrust plate 66 and the bearing 68 are placed upon the left end of the shaft 30 and the shaft is inserted into the axial passageway 114 in the fixture 106. If the fixture 106 is inclined at an angle to the horizontal the shaft 30 will be likewise inclined and no axial clearance will exist between the components now on the shaft 30. Curable adhesive 126 is placed on the periphery of the bearing 68 and the container 40, with the bearing 58 bonded coaxially in place, is placed over the assemblage carried by the fixture 106 with the shaft 30 being journaled within the journal surface 60 of the bearing 58.

A position indicator on the container 40 such as a notch (not shown) is provided to make certain that the same rotational relationship exists between the container and the fixtures 88 and 106.

Due to the coaxial relationships mentioned there exists a coaxial alignment of the bearing 68 within the cylindrical portion 52 of the container 40. The stepped arrangement of the container 40 has, along with a spring member similar to the spring member 122 and the radial extension 112, ensured that no curable adhesive 126 has wiped off on either the cylindrical portion 48 or the frustro-conical portion 50 of the container 40.

The threaded adjustment rod 116 is rotated until the shaft 30, which abuts its interior end, moves the attached rotor 26. The abutting bearing 58 and bonded container 40 are thereby moved to achieve proper axial clearance beetween the thrust washer 64, the thrust plate 66, and the bearing 68. The proper location of the components is now fixed by activation of sources of heat 128 located around the periphery of the container 40 to cure the curable adhesive 126 on the periphery of the bearing 68.

Upon bonding the bearing 68 in place, the rotor is coaxially fixed in position between the bearings 58 and 68 and the shaft 30 is coaxial with the rotor and the outer diameter of the container 40. The orifice insert 78 is placed in the left opening of the shaft 30 and the impeller 32 is fixed to the left end of the shaft. The entire rotor assemblage is inserted into the coaxial stator bore 28. The seal 38 is placed in position against the flange 42 and the pump chamber casing 14 is attached so as to bear against and seal the pumping chamber 12 from the stator 24 by compressing the seal 38 in place against the flange 42.

By virtue of the assembly method it can be appreciated that the bearings 58 and 68 have been coaxially located and fixed within the container 40; the rotor, coaxially fixed upon a coaxially journaled shaft 30 is likewise coaxial with the container 40 and the container 40 is coaxial with the stator. To paraphrase a tautology: things coaxial to the same thing are coaxial to each other. The rotor is therefore coaxially located with respect to the stator. The container 40 and the relation of the stator bore 28 thereto serves as a predetermined air gap and aids in the proper functioning of the pump 10.

If, due to manufacturing processes, the containr 40 is sufficiently out-of-round to present difficulties when the container is inserted into the stator bore 28, an additional assembly step will be necessary. An additional sleeve-like fixture will be provided with an inside diameter equal to the minimum stator bore. This sleeve-like fixture is inserted over the outside of the container 40 during assembly. The added weight of this fixture will provide the force necessary for proper contact between the bearings and the inside of the container and the spring 122 may be dispensed with.

An alternate method of assembly includes application of the curable adhesive to portions of the interior of the cylindrical portions of the container 40 which will be adjacent to the bearings 58 and 68 when the rotor assemblage is in an assembled condition. These adjacent portions would be the areas where the bearings 58 and 68 would be affixed, namely, cylindrical portion 56 and the left part of the cylindrical portion 52.

As noted above, the existence of the seal 74 and the orifice constrictor 78 minimizes the entrance of contaminating foreign particles (contained within the fluid to be pumped) into the interior of the container 40. Despite this, when malfunction of the rotor 26 requires its replacement, the replacement can be accomplished with a minimum of work and expense. The pump chamber casing 14 and the pump motor housing 22 are detached, the container 40 with its included assemblage of parts is removed from the stator bore, and a replacement rotor assemblage is inserted. The pump chamber casing 14 and the pump motor housing 22 are reattached. The pump 10 can thus be rendered serviceable again in a very rapid and inexpensive manner.

While one embodiment of the present invention has been illustrated and has been described in detail herein along with the method of assembly, it would be readily appreciated to those skilled in the art that numerous modifications and changes may be made without departing from the spirit and scope of the present invention.

What is claimed is:

1. A rotor and shaft package adapted for insertion within the bore of a stator, comprising a generally cylindrical container formed of a material having a low magnetic permeability, bearing means in said container, said bearing means including a journal surface, a shaft journaled in said journal surface, a rotor mounted on said shaft for rotation in said container, said container including aligning means for coaxially aligning said container with said stator, means for fixing said bearing means relative to said container so that said shaft is journaled in said bearing means coaxial with said container, said means for fixing said bearing means including a curable adhesive for bonding said bearing means to the inner surface of said container, said bearing means being sized slightly smaller but generally similar in shape to the portion of said inner surface to which said bearing means is bonded, whereby when said container is aligned coaxial with said stator said shaft is coaxial with said stator.

2. The rotor and shaft package in claim 1, wherein said bearing means includes a bearing positioned on each side of said rotor.

3. The rotor and shaft package in claim 2, wherein said means for fixing said bearing means further includes the inner surface of said container being sized smaller at one end than the rest of said container so that the bearing closest to that end can be inserted through the other end with curable adhesive on the outer surface thereof and moved axially into place in said smaller end without depositing said curable adhesive on other portions of the inner surface of said container.

4. The rotor and shaft package in claim 3, wherein said means for fixing said bearing means further including the inner surface of said container having a middle portion sized larger than said one end, the other end being sized larger than said middle portion so that the bearing closest to said other end can be inserted through that end with curable adhesive on the outer surface thereof and moved axially into place at the beginning of said middle portion without depositing curable adhesive on any other portion of the inner surface of said container.

5. A dynamoelectric machine, comprising the combination of a stator having an axial bore and a rotor and shaft package inserted coaxial within said bore, said package including a generally cylindrical container formed of a material having a low magnetic permeability, bearing means in said container, said bearing means including a journal surface, a shaft journaled in said journal surface, a rotor mounted on said shaft for rotation in said container, said container including aligning means for coaxially aligning said container with said stator, means for fixing said bearing means relative to said container so that said shaft is journaled in said bearing means coaxial with said container, said means for fixing said bearing means including a curable adhesive for bonding said bearing means to the inner surface of said container, said bearing means being sized slightly smaller but generally similar in shape to the portion of said inner surface to which said bearing means is bonded, whereby when said container is aligned with said stator said shaft is coaxial with said stator.

6. The dynamoelectric machine in claim 5, wherein said bearing means includes a bearing positioned on each side of said rotor.

7. The dynamoelectric machine in claim 6, wherein said means for fixing said bearing means further includes the inner surface of said container being sized smaller at one end than the rest of said container so that the bearing closest to that end can be inserted through the other end with curable adhesive on the outer surface thereof and moved axially into place in said smaller end without depositing said curable adhesive on other portions of the inner surface of said container.

8. The dynamoelectric machine in claim 7, wherein said means for fixing said bearing means further includes the inner surface of said container having a middle portion sized larger than said one end, the other end being sized larger than said middle portion so that the bearing closest to said other end can be inserted through that end with curable adhesive on the outer surface thereof and moved axially into place at the beginning of said middle portion without depositing curable adhesive on any other portion of the inner surface of said container.

\* \* \* \* \*